(12) United States Patent
Nawa et al.

(10) Patent No.: US 7,064,522 B2
(45) Date of Patent: Jun. 20, 2006

(54) SECONDARY BATTERY WITH DISPLAY TO INDICATE RESIDUAL CAPACITY

(75) Inventors: Kazuyasu Nawa, Tokyo (JP); Yukio Tsuchiya, Kanagawa (JP); Hideyuki Sato, Chiba (JP); Hisashi Aoki, Aichi (JP); Tatsuya Yamazawa, Aichi (JP)

(73) Assignee: Sony Corporation, Tokyo (JP)

( * ) Notice: Subject to any disclaimer, the term of this patent is extended or adjusted under 35 U.S.C. 154(b) by 336 days.

(21) Appl. No.: 10/730,241

(22) Filed: Dec. 8, 2003

(65) Prior Publication Data

US 2004/0164715 A1  Aug. 26, 2004

(30) Foreign Application Priority Data

Dec. 10, 2002  (JP) .............................. 2002-358574

(51) Int. Cl.
*H01M 10/46* (2006.01)
(52) U.S. Cl. ..................................... 320/132
(58) Field of Classification Search ................ 320/132, 320/149; 324/426, 430, 433; 702/63, 64, 702/65; 429/90
See application file for complete search history.

(56) References Cited

U.S. PATENT DOCUMENTS 5,164,761 A * 11/1992 Isono et al. .................. 396/279
5,172,044 A * 12/1992 Sasaki et al. ................ 320/160
5,847,566 A * 12/1998 Marritt et al. ............... 324/427

* cited by examiner

*Primary Examiner*—Edward H. Tso
(74) *Attorney, Agent, or Firm*—Frommer Lawrence & Haug LLP; William S. Frommer

(57) ABSTRACT

The present invention is to provide a display for a secondary battery in response to the status thereof. For this end, the secondary battery is provided with the display section including LEDs and the switch. If the switch is operated while the secondary battery is being exhibited in a shop, displays to give an image what happens after purchase of the secondary battery are preformed in the display section. Such displays differ from each other in the charging mode and the discharging mode of the secondary battery. For example, in the charging mode, LEDs are sequentially lighted to indicate that the secondary battery is being charged. Additionally, by controlling the LEDs based on the timing calculated from the charging current magnitude through the secondary battery, it is possible to indicate such information if the charging is approaching to the final stage.

12 Claims, 13 Drawing Sheets

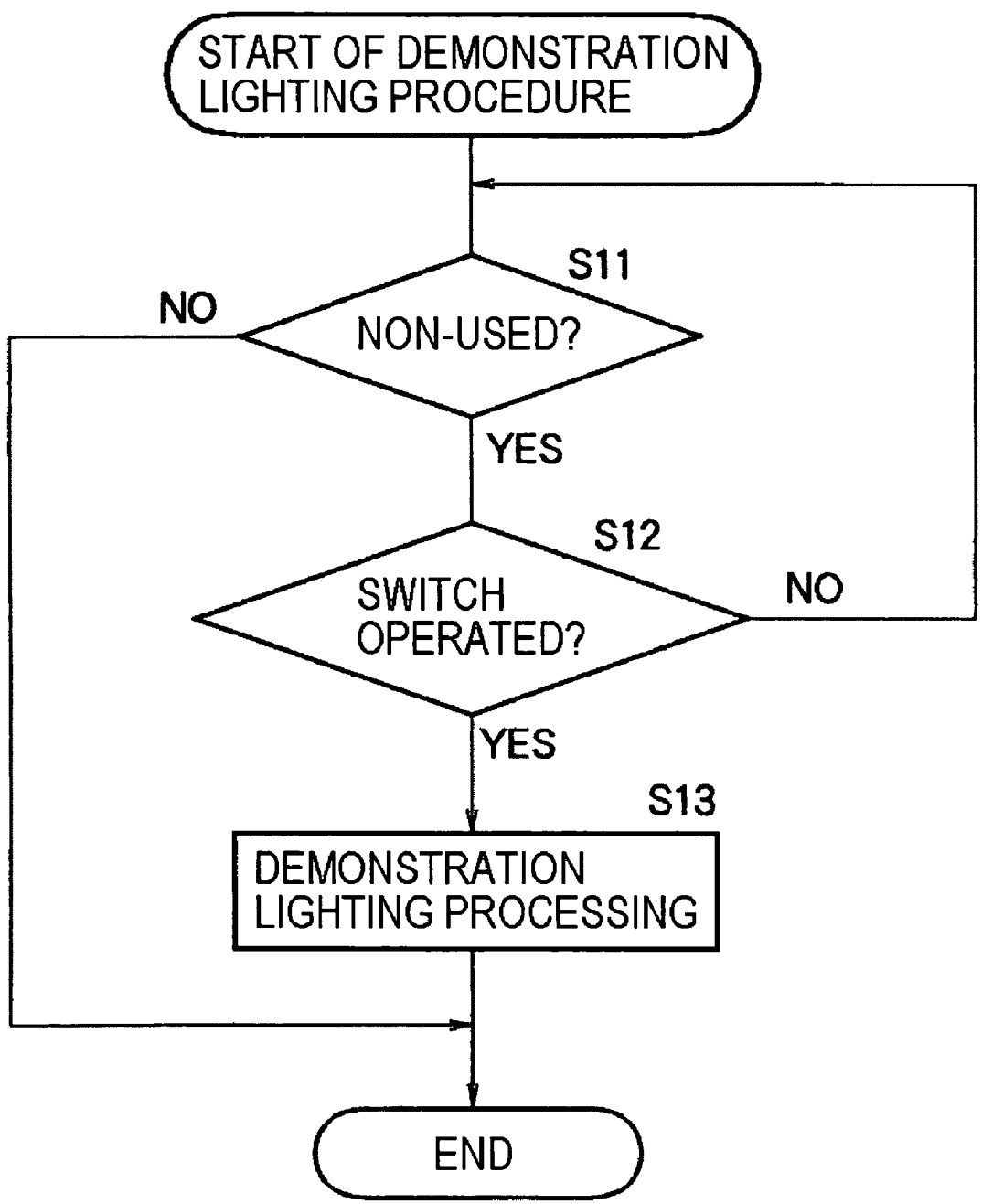

SECONDARY BATTERY WITH DISPLAY TO INDICATE RESIDUAL CAPACITY

CROSS REFERENCE TO RELATED APPLICATION

This application claims priority from Japanese Priority Document No. 2002-358574, filed on Dec. 10, 2002 with the Japanese Patent Office, which document is hereby incorporated by reference.

BACKGROUND OF THE INVENTION

1. Field of the Invention

The present invention relates generally to a secondary battery, a display method, a recording medium and a program, more specifically to a method, a recording medium and a program to let the user know or recognize the residual capacity of a secondary battery.

2. Description of Related Art

There are batteries to be installed in a video camera or the like for supplying operating electrical power to a device (or an equipment) in which the batteries are installed. Improved performance of such batteries enables a user to extend the operating time of such device. The batteries can be classified into a primary battery which can be used only once until its electrical capacity is consumed, and a secondary battery which is repeatedly usable by connecting to a dedicated charger when its electrical capacity is consumed depending on the number of their usage. In other words, the secondary battery is the battery which is reusable for many times by repeatedly recharging it.

Among such secondary batteries, there exists a secondary battery which is equipped with a display or an indicator for indicating its residual capacity so that a user can recognize the proper timing for charging, for example. (See, for example, Japanese Patent No.3225580, Japanese Non-examined Patent Publication No.5-283110, and Japanese Non-examined Patent Publication No.9-167638).

In order to indicate for the user to recognize the residual capacity of a secondary battery, it is necessary to judge the residual capacity. One typical method of judging the residual capacity is to monitor the voltage change of the secondary battery. However, a method of simply monitoring the voltage change encounters a problem that it is hard to judge accurate residual capacity.

Now, such problem will be described in detail with reference to FIG. 1 which shows a graph of the residual capacity or the voltage of a secondary battery in the vertical axis as a function of time in the horizontal axis. As the time passes, the residual capacity of an actual secondary battery decreases like a linear function as shown by a line A. The voltage of the secondary battery decreases gradually at the initial stage, but decreases sharply after elapsing a certain time as shown by a line B, which is not a linear function.

As described hereinabove, since the voltage of a secondary battery which is the original data for the display for a user to identify the residual capacity of the secondary battery does not change like a linear function, the electrical capacity of the secondary battery to be calculated based on the voltage becomes as shown by a line C. In other words, the line C indicating the residual capacity to be calculated based on the voltage change of the line B becomes also a line that decreases sharply after elapsing a certain time similar to the line B. A numerical difference between the line A and the line C results in an error between the actual residual capacity and the residual capacity calculated by the voltage. As shown in FIG. 1, an encountered problem is that the error is very large and thus information which is provided to the user as the residual capacity is rough and is not necessarily accurate.

Even if provided the information which is not necessarily accurate to the user, the user can utilize such information to make a decision of the timing when the secondary battery is to be charged. In other words, the user feels a good usability to the secondary battery having such means to give the residual capacity as compared to a secondary battery having no such means. This is the reason why a secondary battery provided with such means is increasingly preferred in the marketplace.

By the way, there are, for example, audio or visual means to let the user recognize the residual capacity. As a display for a user to recognize the residual capacity, it is preferable to provide more accurate information in a manner easily understood by the user, and thus improving usability. For this end, it is preferable that the user is able to try the indication or display of the residual capacity when he/she is going to buy such secondary battery.

However, an encountered problem is that it is difficult for a user to check the way of displaying the usability (or the display function) when the user buys such secondary battery, i.e., when it is exhibited in a shop.

Additionally, even if the display function can be checked while a secondary battery is exhibited in a shop, there is a problem that the user can check only one display mode at the instance when the user is checking. That is, the user can check only one condition among various display conditions, for example, either condition when the secondary battery is fully charged or it is empty even if the each condition has different display mode, respectively.

The reason is that the residual capacity of a secondary battery does not substantially change while it is in a shop, thereby always providing the same display while checking a secondary battery. As a result, even if a secondary battery is provided with improved display functions, it is impossible to sufficiently demonstrate or appeal such features in a shop.

SUMMARY OF THE INVENTION

The present invention has been made in consideration of the above circumstances and it is one aspect of the present invention to provide display features which are able to appeal usability to the user in a shop or the like. It is another aspect of the present invention to provide display features capable of surely letting the user recognize the fully charged condition when a secondary battery is fully charged.

A first secondary battery according to the present invention includes time measuring means for measuring the elapsed time when the battery is charged or discharged, memory means for storing accumulated information of the elapsed time measured by the time measuring means, display means comprising a plurality of luminous bodies for displaying a predetermined information by lighting such luminous bodies, and judging means for judging if the elapsed time represented by the time information stored in the memory means exceeds a designated elapsed time in case when instructed to display the designated information by the display means, wherein the display means displays all display patterns of the information relating to the residual capacity of the secondary battery as the designated information regardless of the residual capacity if it is determined by the judging means that the elapsed time represented by the time information does not exceed a designated elapsed time.

The memory means stores as the time information the accumulated charging time in the charging mode and the accumulated discharging time in the discharging mode. The judging means makes a judgment if the elapsed time represented by at least one of the charging time and the discharging time exceeds the designated elapsed time.

The display of all display patterns of the information relating to the residual capacity by the display means can be one either incrementing or decrementing the number of lighting luminous bodies among the plurality of luminous bodies.

A first display method according to the present invention includes a time measuring step for measuring the charging time or the discharging time of a secondary battery, a storage control step for control storage of the accumulated time information of the time as measured by the processing in the time measuring step, a control step for controlling display means which comprises a plurality of luminous bodies for displaying designated information by lighting the luminous bodies, and a judging step for making a judgment if the time information as storage controlled in the processing in the storage control step exceeds a designated elapsed time whenever instructed to control the display of the designated information in the processing in the control step, wherein the control step performs to display all display patterns of the information relating to the residual capacity of the secondary battery as the designated information regardless of the residual capacity in case when the time represented by the time information is determined not to exceed the designated elapsed time in the processing in the judging step.

A first program in a recording medium according to the present invention includes a time measuring step for measuring the charging time or the discharging time of a secondary battery, a storage control step for storage controlling the accumulated time information of the elapsed time measured in the processing in the time measuring step, a control step for controlling display means comprising a plurality of luminous bodies for displaying designated information by lighting the luminous bodies, and a judging step for making a judgment if the time represented by the time information as storage controlled in the processing in the storage control step exceeds a designated elapsed time whenever instructed to control the display of the designated information in the processing in the control step, wherein the control step controls the display of all display patterns relating to the residual capacity of the secondary battery as the designated information if it is determined that the time represented by the time information does not exceed the designated elapsed time in the processing in the judging step.

A first program according to the present invention lets a computer to execute a time measuring step for measuring the charging time or the discharging time of a secondary battery, a storage control step for controlling storage of the accumulated time information of the time as measured in the processing in the time measuring step, a control step for controlling display means which comprise a plurality of luminous bodies for displaying designated information by lighting the luminous bodies, and a judging step for making a judgment if the time represented by the time information controlled as storage in the processing in the storage control step does not exceed the designated elapsed time when instructed to control the display of the designated information in the processing in the control step, wherein the control step controls to display all display patterns relating to the residual capacity of the secondary battery as the designated information regardless of the residual capacity if it is determined that the time represented by the time information does not exceed the designated elapsed time in the processing in the judging step.

A second secondary battery according to the present invention includes detection means for detecting the current flowing inside the secondary battery, display means comprising a plurality of luminous bodies, calculation means for calculating the timing of lighting the luminous bodies in response to the current detected by the detection means, and control means for controlling the display means based on the timing which is calculated by the calculation means.

The control means sequentially lights the plurality of luminous bodies of the display means and the calculation means calculates the timing of lighting them.

In case of detecting the current by the detection means in the discharging mode, the control means controls the display means only when instructed to display by the display means. On the other hand, in case of detecting the current by the detection means in the charging mode, the control means controls the display means regardless of instructions to display by the display means.

A second display method according to the present invention includes a detection step for detecting the current flowing inside a secondary battery, a display control step for controlling the display of display means comprising a plurality of luminous bodies, and a calculation step for calculating the timing to light the plurality of luminous bodies in response to the current as detected in the processing in the detection step, wherein the display control step controls the display of the display means based on the timing which is calculated in the processing in the calculation step.

A second program recorded in the recording medium according to the present invention includes a detection step for detecting the current flowing inside a secondary battery, a display control step for controlling the display of display means which comprise a plurality of luminous bodies, and a calculation step for calculating the timing to light the plurality of luminous bodies, wherein the display control step controls the display of the display means based on the timing which is calculated in the processing of the calculation step.

A second program according to the present invention lets a computer to execute a detection step for detecting the current flowing inside a secondary battery, a display control step for controlling the display of display means which comprise a plurality of luminous bodies, and a calculation step for calculating the timing to light the luminous bodies in response to the current which is detected in the processing in the detection step, wherein the display control step controls the display of the display means based on the timing which is calculated in the processing in the calculation step.

In the first secondary battery, display method, recording medium and program according to the present invention, in case, for example, when the secondary battery is exhibited in a shop and instructed by a user to display designated information, the secondary battery is judged to be the non-used condition by using the accumulated time information for the stored charging or discharging time. Based on the judgment, a display is performed as if it is being used even if it is in the non-used condition.

In the second secondary battery, display method, recording medium and program, when it is in the charging mode or in the discharging mode, the current flowing inside the secondary battery is judged and a display representing the current value is performed.

According to the present invention, residual capacity of the secondary battery can be displayed effectively. Additionally, the present invention is capable of accurately displaying the residual capacity of the secondary battery. It is possible to provide not only the display of the residual capacity of the secondary battery but also other displays to let the user recognize, for example, the secondary battery is being charged or discharged. Furthermore, the present invention is capable of letting the user recognize by intuition the current in a charging mode or a discharging mode.

BRIEF DESCRIPTION OF THE DRAWINGS

In the drawings:

FIG. 8 is a flowchart for describing demonstration lighting of the LEDs;

DETAILED DESCRIPTION OF THE PREFERRED EMBODIMENTS

Figure 1:
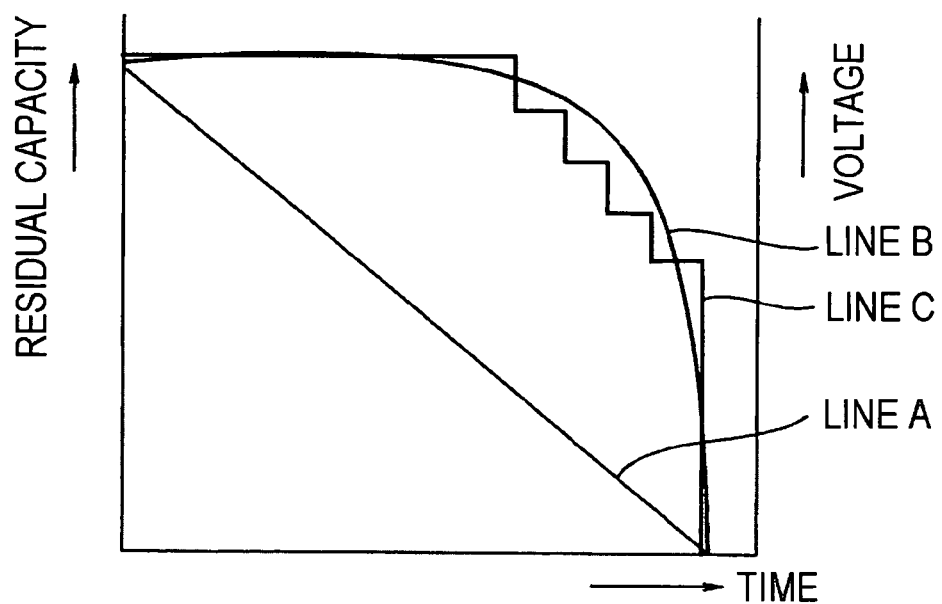
FIG. 1 is a graph for describing errors between the actual residual capacity and a calculated residual capacity of a conventional secondary battery.
Figure 2:
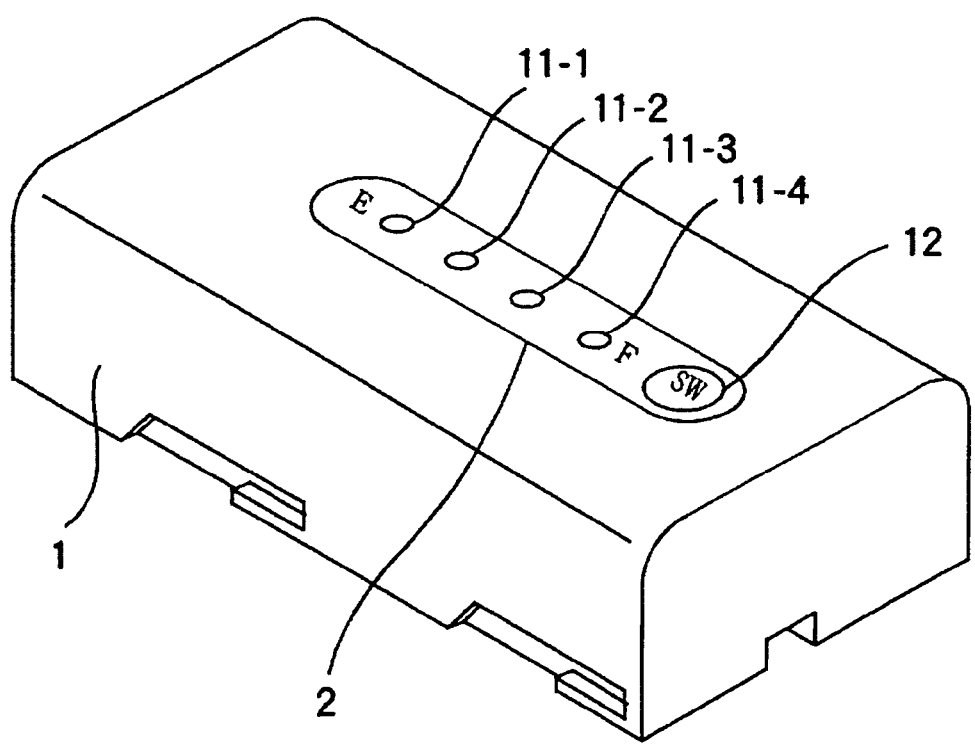
FIG. 2 is an exterior view of one embodiment of the secondary battery to which the present invention is applied.

Now, embodiments of the present invention will be described in detail by reference to the accompanying drawings. FIG. 2 is a perspective view which shows an exterior construction of one embodiment of a secondary battery to which the present invention is applied. A secondary battery 1 is provided with a display section 2 on the upper surface thereof. Although the detail will be described hereinafter, the display section 2 comprises LEDs (Light Emitting Diodes) 11-1 through 11-4 which are used when displaying the residual capacity of the secondary battery 1.

The display section 2 is also provided with a switch 12, and the display of the residual capacity of the secondary battery 1 by the LEDs 11-1 through 11-4 is carried out upon operation of the switch 12. In the following description, the LEDs 11-1 through 11-4 are collectively referred to as the LEDs 11 if they need not to be distinguished individually. The same is true with the other sections.

Although not shown in FIG. 2, terminals for supplying electrical power to a device in which the secondary battery 1 is installed and for sending/receiving information with other devices are provided on a surface (the bottom surface) opposite to the display section 2 of the secondary battery 1.

Figure 3:
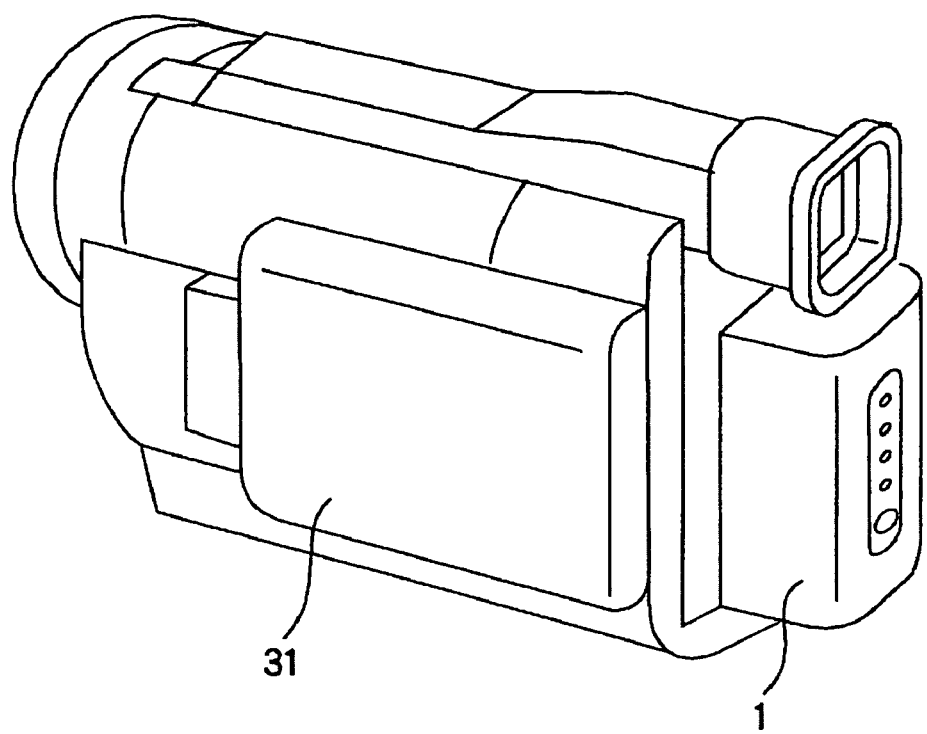
FIG. 3 is a perspective view of a video camera in which the secondary battery is installed.

The secondary battery 1 is used in combination with such device as, for example, a video camera 31 as shown in FIG. 3. When installed in such device, the secondary battery 1 supplies the electrical power required by the device. When the secondary battery 1 is installed in a predetermined product, the display section 2 provides a display which shows the condition when operating the switch 12 by the user.

Figure 4:
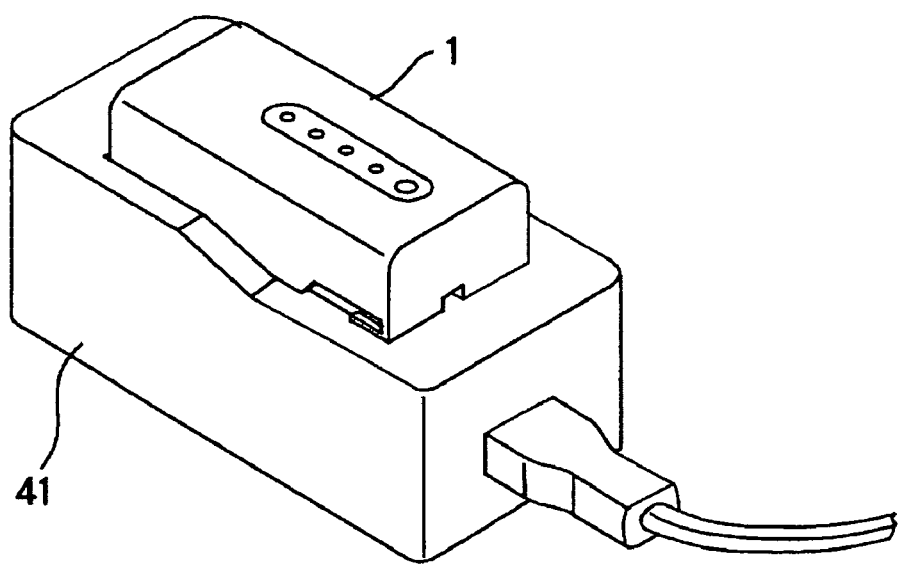
FIG. 4 is a perspective view of the secondary battery mounted on a battery charger.

As shown in FIG. 4, when the residual capacity of the secondary battery 1 is empty, it is mounted on the dedicated charger 41 for charging it. When the residual capacity is restored, the secondary battery 1 returns to a usable condition. In the fully charged condition of the secondary battery 1, the display section 2 provides a display to let the user easily know or recognize that the secondary battery is in the charged condition.

Figure 5:
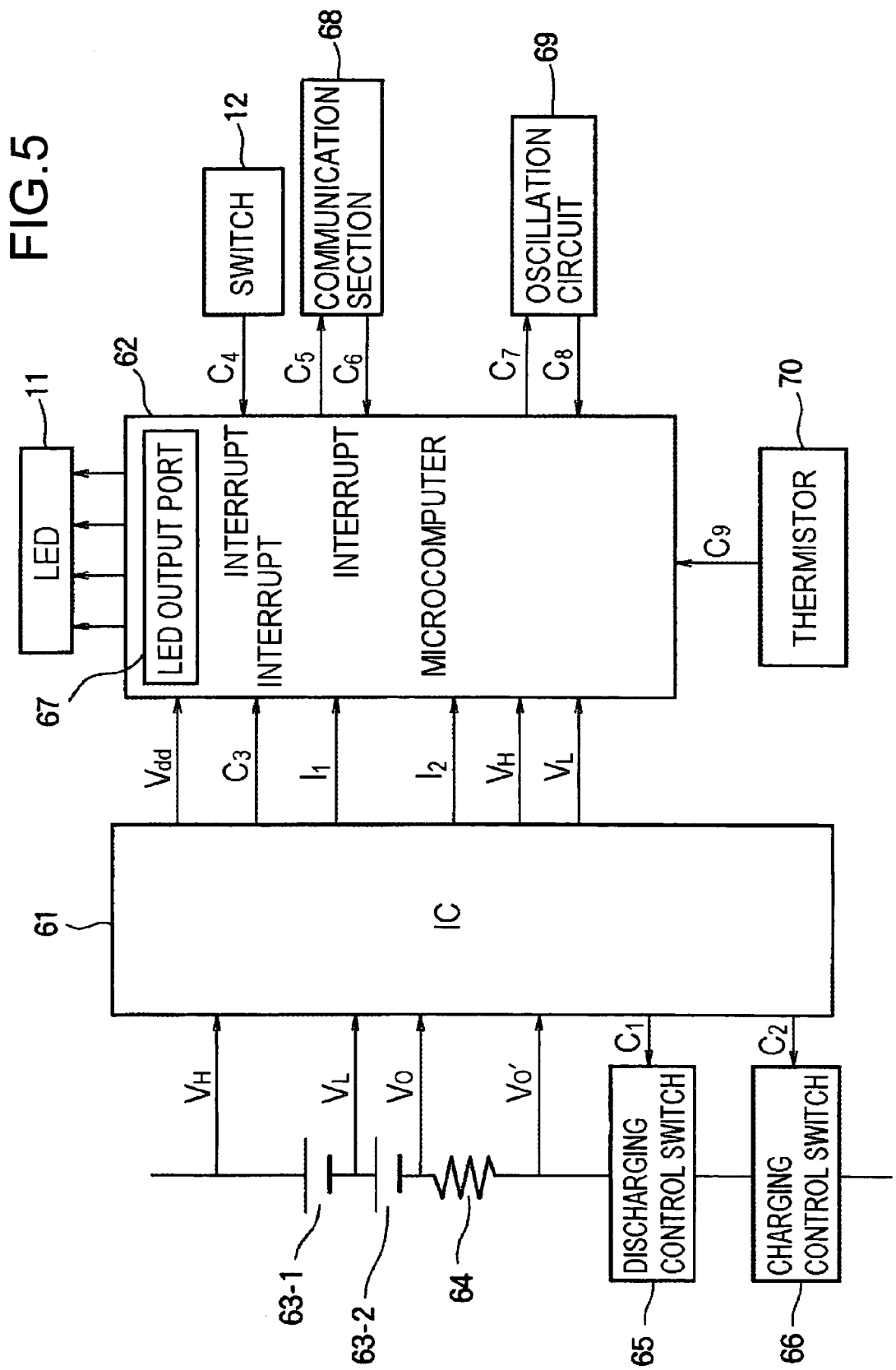
FIG. 5 is a block diagram of an exemplified internal construction of the secondary battery.

FIG. 5 is a block diagram to show the exemplified internal construction of the secondary battery 1. The secondary battery 1 is provided with an IC (Integrated Circuit) 61 and a microcomputer 62. Rechargeable batteries 63-1 and 63-2 are installed in the secondary battery 1. Although it is described herein that the secondary battery 1 comprises the battery cell 63-1 and the battery cell 63-2, the batteries 63 comprise physically a plurality of cells which are divided into two herein. One of them is referred to as the battery cell 63-1 while the other is referred to as the battery cell 63-2.

Supplied to the IC 61 are the combined voltage Vh of the both battery cells 63-1 and 63-2, the voltage V1 of the battery cell 63-2 alone, and the voltage (or the ground voltage) V0 on the minus side of the battery cell 63-2.

A resistor 64 is connected in series with the minus side of the battery cell 63-2. The resistor 64 has a relatively low resistance, for example, 50 mΩ. The IC 61 calculates the voltage across the resistor 64 based on the voltage difference between the voltage V0 and the voltage V0' at both ends of the resistor 64. The current value flowing through the resistor 64 is calculated by using the voltage difference.

A discharging control switch 65 is a switch provided to interrupt discharging of the secondary battery 1 in the over-discharging condition when the power to be supplied from the secondary battery 1 to the other device exceeds the predetermined value, i.e., when it is determined that discharging may damage the secondary battery 1 and/or the other device to which the secondary battery 1 is connected. Switching of the discharging control switch 65 is controlled by a command C1 from the IC 61.

Similarly, a charging control switch 66 is a switch for controlling interruption of charging so that the secondary battery 1 is not charged any more when it is determined that further charging will lead to over-charging of the secondary battery 1 in the charging step (i.e., when the secondary battery 1 is determined to be in the over-charging condition). Switching of the charging control switch 66 is under control of a command C2 from the IC 61. The discharging control switch 65 and the charging control switch 66 may be configured, for example, by including FETs (Field Effect Transistors).

The microcomputer 62 performs all controls within the secondary battery 1, primarily based on information from the IC 61. A microcomputer driving power supply Vdd from the IC 61 is supplied to the microcomputer 62. The microcomputer 62 is not operating at all the time but is driven upon receiving instruction from the IC 61 (i.e., when a command C3 is inputted). In this arrangement, it is possible to reduce power consumption of the microcomputer 62 and thus power consumption from the secondary battery 1.

A charging current I1 and a discharging current I2 are also supplied to the microcomputer 62. These current values are used, for example, for judging the condition of the secondary battery 1, for measuring the charging time, etc. The voltage values Vh and Vl from the IC 61 are also supplied to the microcomputer 62.

The microcomputer 62 is provided with an LED output port 67 to which the LEDs 11-1 through 11-4 (see FIG. 2) are connected. Also, a command C4 from the switch 12 (see FIG. 2) is supplied to the microcomputer 62. Upon supplying the command C4, the microcomputer 62 controls lighting of the LEDs 11 depending on the current conditions.

When the secondary battery 1 is connected to another device, for example, the video camera 31 (see FIG. 3), a communication section 68 is provided for sending and receiving information to and from the video camera 31. Information to be sent and/or received is, for example, the residual capacity of the secondary battery 1. Based on such information, the video camera 31 is able to perform such processing as displaying how much the residual capacity of the secondary battery 1 on a built-in display or the like is.

An oscillation circuit 69 supplies a driving clock to the microcomputer 62. The microcomputer 62 is able to measure the time based on the clock. A thermistor 70 is used for measuring temperature outside of the secondary battery 1 and/or the secondary battery 1 itself. Measured temperature information is supplied to the microcomputer 62. For example, if the temperature measured by the thermistor 70 exceeds the predetermined value, the secondary battery 1 may possibly damaged. In such circumstance, the discharging control switch 65 and/or the charging control switch 66 are turned off in order to prevent the secondary battery 1 from being damaged in advance.

Figure 6:
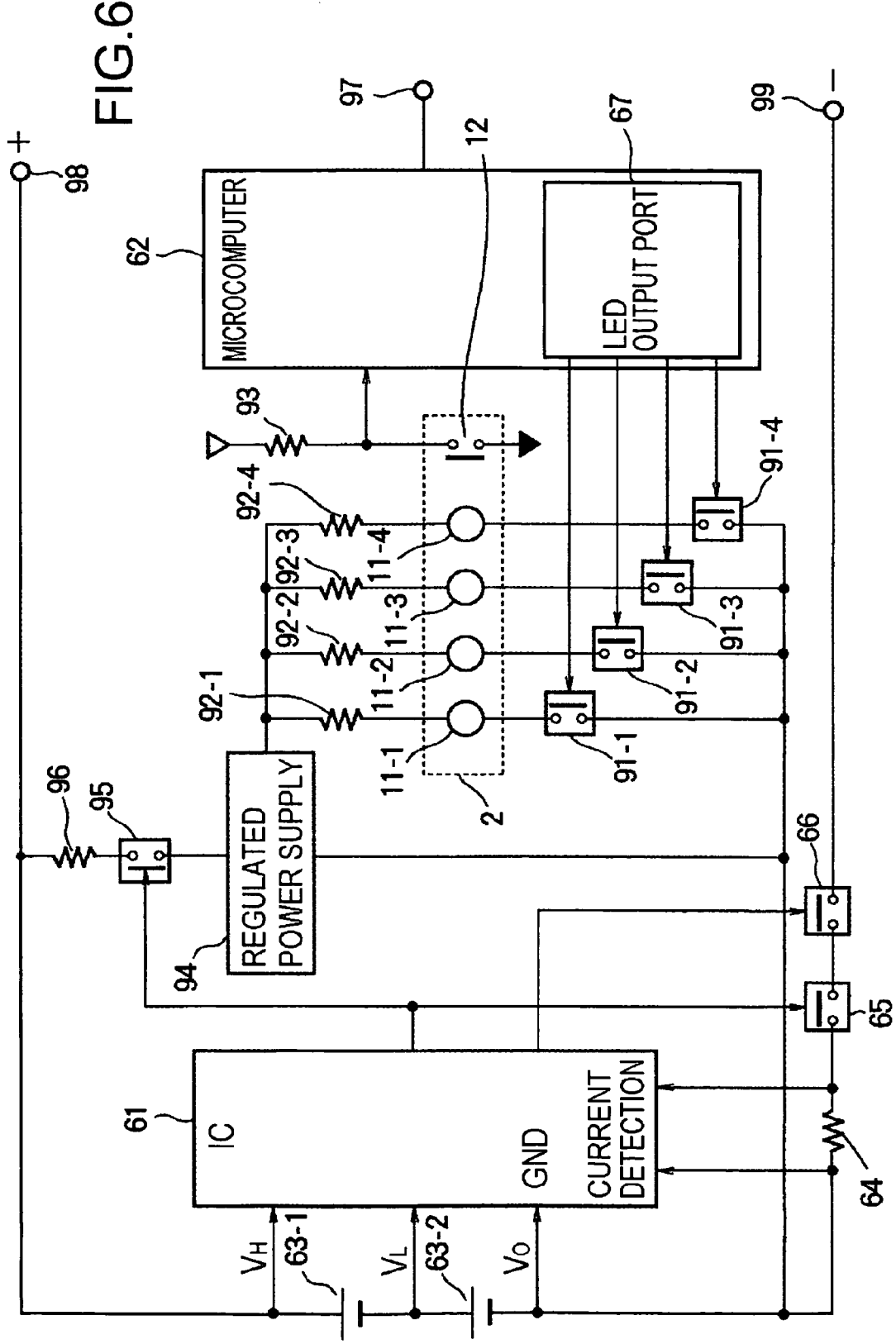
FIG. 6 is a detailed circuit schematic of the section relating to the LED display within the secondary battery.

FIG. 6 is a detailed block diagram of the section relating to the LEDs 11. One end of the LED 11-1 is connected to an LED driving control switch 91-1 while the other end is connected to an LED current limiting resistor 92-1. Similarly, the LEDs 11-2 through 11-4 are connected to LED driving control switches 91-2 through 91-4 at their one ends while connected to current limiting resistors 92-2 through 92-4 at the other ends, respectively.

Each one end of the LED driving control switches 91 is connected to each of the LEDs 11 while each of the other ends is connected to the minus side (ground) of the battery cell 63-2. The LED driving control switches 91 are connected to the LED output port 67 and switched under control of the microcomputer 62.

On the other hand, the LED current limiting resistors 92 are provided to prevent over-current to flow through the LEDs 11. As mentioned hereinabove, the switch 12 is a physical switch to be operated by the user. A resistor 93 is connected to one end of the switch 12 in order to prevent sudden voltage or current change when the switch 12 is operated.

Connected to the opposite side of the LED current limiting resistors 92 with respect to the LEDs 11 is a regulated power supply 94 which is connected to ground at one end while connected at the other end to a display power control switch 95 which is switched in accordance with instructions from the IC 61. When the display power control switch 95 is in the closed condition, power is supplied to the LEDs 11.

The regulated power supply 94 is provided in order to stabilize the power to be supplied to the LEDs 11.

An over-current protection resistor 96 is connected to one end of the display power control switch 95 in order to prevent sudden current flow when it is closed. One end of the over-current protection resistor 96 is connected to the plus side of the battery cell 63-1.

The plus side of the battery 63-1 is also connected to a plus terminal 98 while the minus side of the battery 63-2 is connected to the minus terminal 99. The plus terminal 98 and the minus terminal 99 are connected to the video camera 31 or the charger 41 (by contacting designated terminals) for supplying or receiving power by way of such contacting terminals. A communication terminal 97 is connected to (or makes electrical contact with) a terminal of the connected device for sending or receiving data by way of the contacting terminal.

Figure 7:
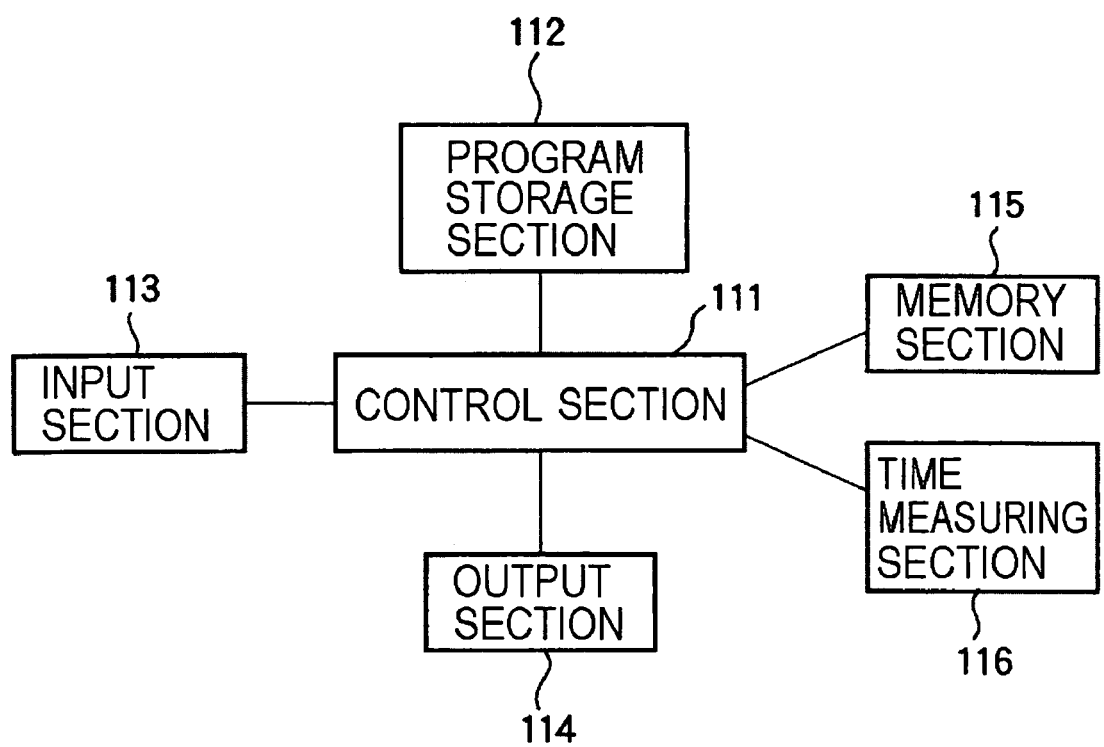
FIG. 7 is a functional block diagram of the section relating to the LED display of the secondary battery.

Now, description will be made on a display process of the display section 2 among various processing in the secondary battery 1. FIG. 7 shows a functional block diagram within the microcomputer 62 for performing the display. A control section 111 carries out a function for controlling the display related processing. Programs as required by the control section 111 for performing the processing are stored in a program storage section 112.

The control section 111 performs various processing in accordance with the programs stored in the program storage section 112. For example, as described hereinabove by reference to FIG. 5, an input section 113 has a function to input various information that are inputted to the microcomputer 62. An output section 114 includes the LED output port 67 and has a function to output control signals or the like to the LEDs 11.

A memory section 115 stores data or the like that is required by the control section 111 in order to perform various processing. A time measuring section 116 performs time measuring processing by using the clock oscillated by the oscillation circuit 69 (FIG. 5).

By the way, the secondary battery 1 is manufactured, for example, in a plant and is one of those exhibited for sale in a shop such as electrical appliance store. When the user is interested in the exhibited secondary battery 1, the user may purchase the secondary battery 1. The purchased secondary battery 1 may be used for supplying power to, for example, the video camera 31 (see FIG. 3). After continued use of the secondary battery 1, the residual capacity will be zero (or very little). When the residual capacity becomes zero, the secondary battery 1 is mounted on the charger 41 (see FIG. 4) in order to be charged. Charging the secondary battery 1 will make the secondary battery 1 in a usable condition again.

In the secondary battery 1, such use (discharging) and charging are repeated for many times. At the end of the lifetime when electrical capacity can not be revived by charging, then the secondary battery 1 is scrapped.

As described hereinabove, the secondary battery 1 is exhibited in a shop to be purchased by a user. The user looks around the exhibited secondary batteries 1 and may buy one if the user likes it. In the process of making the buy/not buy decision, it is most likely that user compares the secondary battery 1 with other secondary battery in a shop. In case of making such comparison or even if no comparison is made, it is important that functions and performance of the secondary battery 1 are sufficiently recognized by a user before the purchasing stage.

Now, one of the features of the secondary battery 1 is the display by the display section 2. A mechanism to let the user know or recognize the usefulness of the display by the display section 2 before purchasing it will be described hereinafter by reference to the flowchart in FIG. 8. On a premise, the secondary battery 1 is contained in a package to gain access to the switch 12 when the secondary battery 1 is exhibited in a shop, thereby enabling the user to operate the switch 12.

Also, when the switch 12 is operated in a shop, the user can recognize what kind of display will appear on the display section 2 after purchasing of the secondary battery 1. Such display in a shop is suitably referred to as a demonstration display herein.

The processing as shown in the flowchart in FIG. 8 is carried out in the control section 111 (see FIG. 7). In step S11, judgment is made if the secondary battery 1 is used or non-used. The non-used condition in step S11 means that charging or discharging, which normally takes place after purchasing, does not take place yet. However, any operation of the switch 12 in a shop while it is being exhibited is not considered as the use. The secondary battery 1 is judged to be non-used condition regardless of the number of operations of the switch 12.

Judgment of the used or non-used condition is made in the following manner. Firstly, the IC 61 keeps monitoring the current flowing through the resistor 64 (see FIG. 6). No current flows through the resistor 64 (strictly, except a very small discharging current) if no discharging or charging takes place. Upon detecting any current through the resistor 64, the IC 61 is designed to transmit the detection to the microcomputer 62.

Such transmission is carried out by transmitting the charging current I1 in the charging mode while the discharging current I2 in the discharging mode. Such current value is inputted to the input section 113 in the functional block diagram in FIG. 7 for application to the control section 111. Upon applying the charging current I1, the control section 111 judges that the secondary battery 1 is in the charging condition, and the time measuring operation by the time measuring section 116 is initiated. Similarly, upon applying the discharging current I2, the control section 111 judges that the secondary battery 1 is in the discharging condition, and the time measuring operation of the time measuring section 116 is initiated.

Stored in the memory section 115 is such information including at least the accumulated charging time and the accumulated discharging time. Such information is generated by accumulatively adding the elapsed time calculated by the time measuring section 116 and stored as described hereinabove. The control section 111 also controls generation of the accumulated time and storage thereof.

As described hereinabove, when charging or discharging of the secondary battery 1 takes place, such information on the accumulated time is stored in the memory section 115. Such stored information on the accumulated time is used to judge if the secondary battery 1 is used or non-used in step S11. When performing the processing in step S11, the control section 111 reads out the information on the charging time (referred to as the charging information below) and the discharging time (referred to as the discharging information below) stored in the memory section 115. If the elapsed time represented by the charging information is less than the preset designated elapsed time or if the elapsed time represented by the discharging information is less than the preset designated elapsed time, judgment is made that the secondary battery 1 is non-used.

It is to be noted that, although the judgment is made here if either one of the elapsed time represented by the charging information and the elapsed time represented by the discharging information is less than the preset designated elapsed time, it is possible to judge if both of the elapsed time represented by the charging information and the time represented by the discharging information are less than the respective preset designated elapsed time.

The preset designated elapsed time may be, for example, 20 seconds for the elapsed time represented by the charging information while 1 minute for the elapsed time represented by the discharging information. The designated elapsed times for the charging information and the discharging information may be preset as different values or the same value.

On the other hand, if at least one of the charging time and the discharging time exceeds the preset designated elapsed time, it is judged that the secondary battery 1 is no longer in the non-used condition.

If it is judged that the secondary battery 1 is not the non-used condition in step S11, i.e., the secondary battery 1 is not a brand-new as exhibited in a shop and is in the condition after purchased by the user, there is no need to perform the demonstration display in a shop and thus ending the processing in the flowchart as shown in FIG. 8.

On the other hand, if the secondary battery 1 is determined to be non-used in step S11, the processing proceeds to step S12 to judge if the switch 12 (see FIG. 6) is operated. It is noted that, although judgment of operating the switch 12 is made after judging if the secondary battery 1 is non-used, such procedure can be suitably changed in the designing stage.

If the judgment is made that the switch 12 is not operated in step S12, the procedure returns to step S11 for repeating the following steps (i.e., remaining in the waiting condition). On the other hand, if the switch 12 is determined to be operated, i.e., when the command C4 (see FIG. 5) indicating that the switch 12 is operated is inputted to the input section 113, the procedure proceeds to step S13 and the control section 111 starts the demonstration display (or lighting).

The demonstration lighting will be described hereunder by reference to FIG. 9A through FIG. 9F. For convenience of description, the display section 2 is shown in FIG. 9A through FIG. 9F without the switch 12. In FIG. 9A through FIG. 9F, lighting LEDs 11 are shown as black dots while blinking LEDs 11 are shown as black dots with radial lines about the dots.

The character "E" at the extreme left of the display section 2 as shown in the drawing represents "EMPTY" while the character "F" at the extreme right of the display section 2 as shown in the drawing represents "FULL". When all of the 4 LEDs 11-1 through 11-4 are lighted (i.e., when the lighting LEDs 11 are reaching near the character "F") as shown in FIG. 9B, it indicates that the residual capacity of the secondary battery 1 is sufficient. On the other hand, when only the LED 11-1 near the character "E" is lighting or blinking as shown in FIG. 9E or FIG. 9F, it indicates that the residual capacity of the secondary battery 1 is little.

Figure 9A:
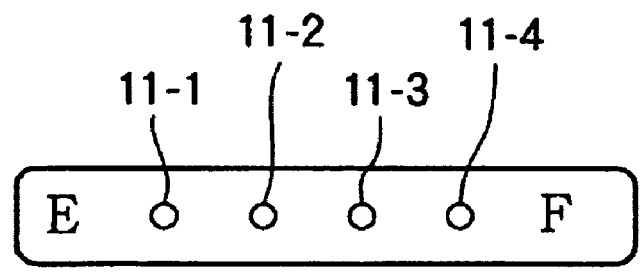
FIGS. 9A to 9F are charts for describing the lightings of the LEDs.
Figure 9B:
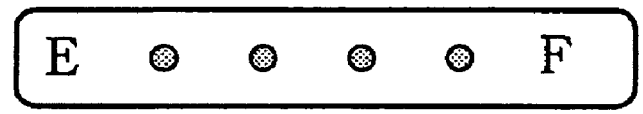

At the starting time of the demonstration lighting in step S13, all of the LEDs 11-1 through 11-4 are unlighted as shown in FIG. 9A. At the next subsequent condition, however, all of the LEDs 11-1 through 11-4 are lighted as shown in FIG. 9B. After maintaining such lighted condition for a given time duration (for example, 625 ms), it shifts to a condition that 3 LEDs 11-1 through 11-3 are lighted as shown in FIG. 9C.

Figure 9C:
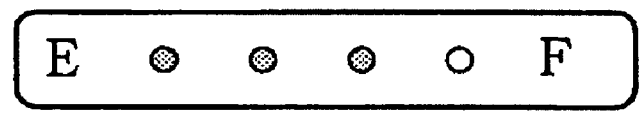
Figure 9D:
Figure 9E:
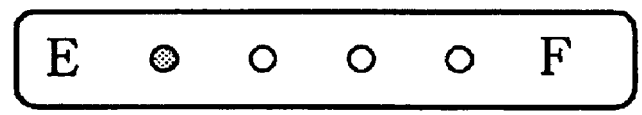
Figure 9F:
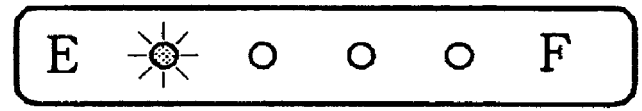

After maintaining the lighted condition as shown in FIG. 9C for a given time duration, it shifts to a condition that only 2 LEDs 11-1 and 11-2 are lighted as shown in FIG. 9D. And then, after maintaining the lighted condition as shown in FIG. 9D, it shifts to a condition that only LED 11-1 is lighted as shown in FIG. 9E.

The display conditions of the display section 2 as described hereinabove are similar to the conditions when the residual capacity of the secondary battery 1 changes from the condition having sufficient residual capacity to the condition having gradually decreasing residual capacity. In other words, the demonstration lighting as shown in FIG. 9A through FIG. 9F simulates how the display conditions change over the time as the secondary battery 1 is used with the video camera 31 or the like.

Finally, when the residual capacity of the secondary battery 1 decreases to almost zero, such condition is indicated by blinking the LED 11-1 as shown in FIG. 9F. In the demonstration display, the display condition as shown in FIG. 9F takes place after maintaining the display condition as shown in FIG. 9E for a given time. And the display of the display section 2 returns to the condition as shown in FIG. 9A (i.e., the condition immediately after operating the switch 12) after maintaining the display condition as shown in FIG. 9F for a given time duration.

Such demonstration lighting is controlled by the control section 111 in accordance with a program stored in the program storage section 112. The control section 111 performs the processing of the demonstration lighting as described hereinabove by reference to FIG. 9A through FIG. 9F under control to the output section 114. Concretely, lighting (or blinking) of the LEDs 11-1 through 11-4 is controlled by sending to the LED output port 67 (see FIG. 6) instructions for identifying the switch or switches to be closed among the switches 91-1 through 91-4.

Such processing of the demonstration lighting is carried out in step S13 in the flowchart as shown in FIG. 8.

As described hereinabove, by providing the demonstration display to show what kind of displays appear in the display section 2 in response to the operation of the switch 12 while the secondary battery 1 is being exhibited in a shop, it is possible to let the user recognize the features of the display of the secondary battery 1.

Such demonstration display is carried out regardless of the residual capacity of the secondary battery 1 at the instance when the switch 12 is operated and all of the 6 patterns as shown in FIG. 9A through FIG. 9F which are prepared for the display in connection with the residual capacity are demonstrated. Accordingly, it is possible that the user feels as if the residual capacity of the secondary battery is changed even in the environment that the residual capacity of the secondary battery 1 does not change as is the case when it is being exhibited in a shop.

It is to be noted that, since no such demonstration display is needed after purchasing the secondary battery 1, it is possible to provide a mechanism not to perform the program relating to the demonstration display from the program storage section 112.

Now, a description will be made hereunder on the display by the display section 2 when the user purchases and installs the secondary battery 1 in, for example, the video camera 31. Such condition can be interpreted as the secondary battery 1 being discharged.

When the secondary battery 1 is being used by connecting to the video camera 31 or the like, one can assume that the display of the information relating to the residual capacity of the secondary battery 1 is not required on the display section 2 because the display on the residual capacity of the secondary battery 1 is normally provided in the video camera 31 to which the secondary battery 1 is connected.

Accordingly, if the switch 12 is operated in the discharging mode, the display section 2 of the secondary battery 1 is conveniently designed not to display the information on the residual capacity of the secondary battery 1 but displays some other information. Although the display section 2 is described to display different information from the residual capacity in the discharge mode in this particular example, it is possible to display information on the residual capacity in the discharging mode when the switch 12 is operated. Also, it is the matter of user's choice what kind of information is to be displayed.

Since the secondary battery 1 according to the embodiment of the present invention is provided with the microcomputer 62, it is possible to provide various displays depending on judgment of various circumstances.

Figure 10:
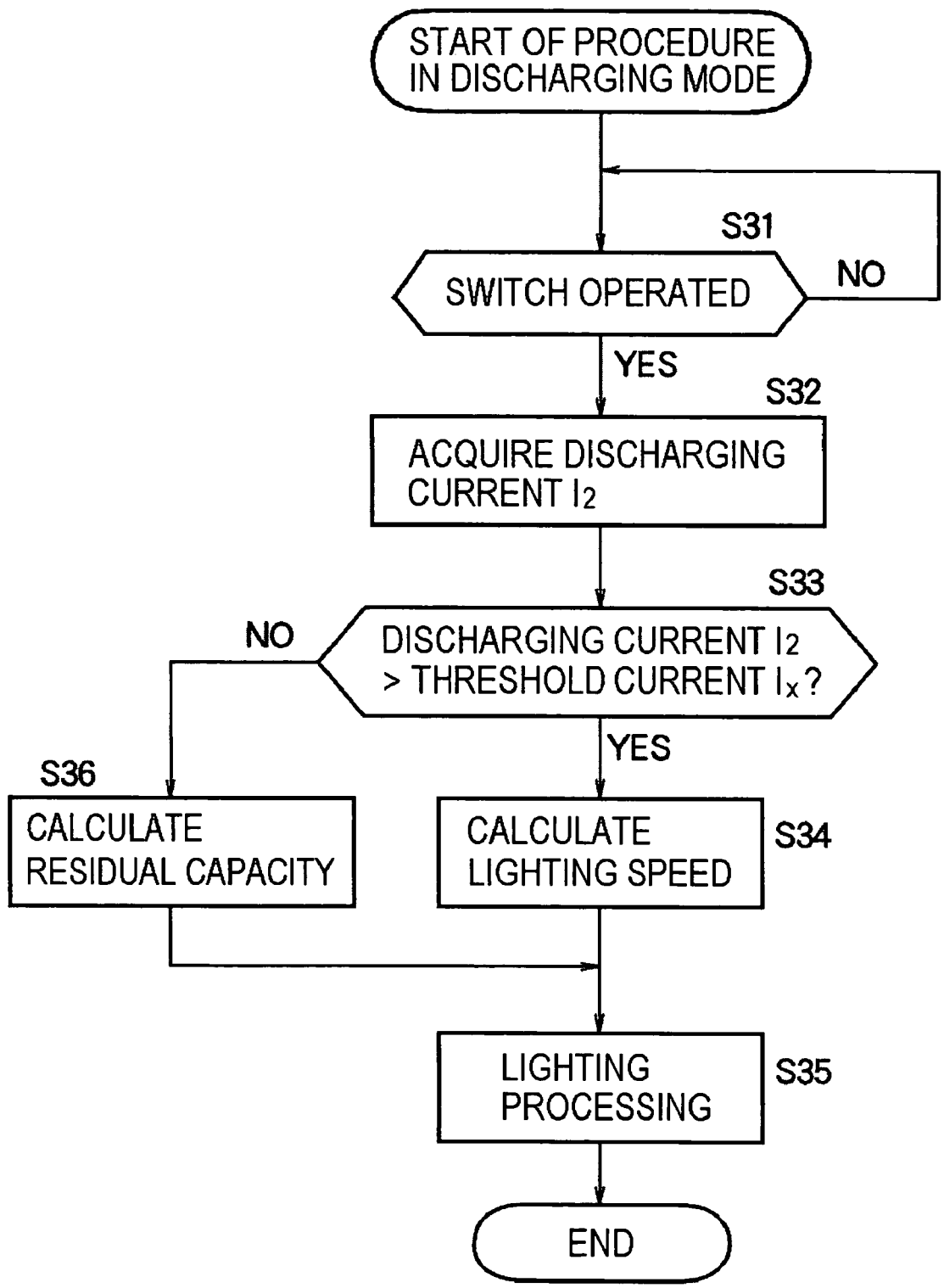
FIG. 10 is a flowchart for describing the operation when the secondary battery is discharging.

Now, an operation of the control section 111 (see FIG. 7) of the microcomputer 62 in the discharge mode will be described hereunder by reference to the flowchart in FIG. 10. In step S31, the control section 111 judges if the switch 12 is operated. Awaiting condition is maintained until the switch 12 is operated. If it is judged in step S31 that the switch 12 is operated, the procedure proceeds to step S32.

The judgment if the switch 12 is operated in step S31 is carried out by judging if the command C4 (see FIG. 5) is inputted in the input section 113. In step S32, the control section 111 acquires the discharge current I2 which is the current flowing through the resistor 64 and is supplied from the IC 61 to the control section 111 in the microcomputer 62 by way of the input section 113.

In step S33, the control section 111 judges if the acquired discharging current I2 is larger than the threshold current Ix. If the discharging current I2 is larger than the threshold current Ix, it indicates that the secondary battery 1 is connected to another device and supplies power to such device. On the other hand, if the discharging current I2 is not larger than the threshold current Ix, it can be determined that the secondary battery 1 is not connected to another device and not supplying power thereto, thereby no current flowing through the resistor 64.

If it is determined that the discharging current I2 is larger than the threshold current Ix in step S33, the procedure moves to step S34 in which the control section 111 calculates the lighting speed. The way of calculating the lighting speed in step S34 varies depending on what kind of lighting process is preformed in step S35. For example, in case of displaying sequentially different number of lighting LEDs as shown in FIG. 9A through FIG. 9E (note that the blinking condition in FIG. 9F is excluded in this case), the timing of switching for lighting (or the time duration for continuing one of the lighting conditions as shown in FIG. 9A through FIG. 9E) is calculated as the lighting speed.

By carrying out the display with different number of sequentially lighting LEDs 11, information to be recognized by the user may indicate the power level being consumed by the device connected to the secondary battery 1. The user is able to intuitively determine if the secondary battery 1 must be replaced earlier due to large power consumption of the device or the secondary battery 1 now in use is sufficient due to relatively small power consumption.

In case of displaying in response to the magnitude of power consumption in the above manner, the display in case of the large power consumption may have, for example, a shorter interval between subsequent display conditions as shown in FIG. 9A through 11-4 is switched in a relatively shorter interval. On the contrary, the display in case of relatively small power consumption may have, for example, a longer interval between subsequent display conditions as shown in FIG. 9A through FIG. 9E so that the number of lighting LEDs 11 including the LEDs 11-1 through 11-4 is switched in a relatively longer interval.

Such display is in agreement with the impression. That is, larger power consumption means that a larger current flows through the resistor 64, which is expressed by the speed of the flow of lighting (or light) of the LEDs 11. The user recognizes by intuition the invisible flow of electrical current by the flow of light of the LEDs 11.

Other than expressing the magnitude of such power consumption (or the current) by changing the number of sequentially lighting LEDs 11 as described hereinabove, it is possible to express, for example, by switching the condition having no lighting LED 11 as shown in FIG. 9A and the condition lighting all of the 4 LEDs 11 as shown in FIG. 9B for a desired number of times, i.e., blinking the 4 LEDs 11.

In case when 4 LEDs 11 are designed to blink, their blinking speed is calculated in step S34. In case when 4 LEDs are designed to blink, for example, the user recognizes by intuition that higher the blinking speed is, the larger is the power consumption.

It is also possible to display in such a manner that only one of the 4 LEDs 11 blinks and that the blinking LED shifts sequentially. For example, it is possible to blink one LED at a time in the sequence of LED 11-4, LED 11-3, LED 11-2 and LED 11-1. In this particular case, the display is to shift the light, for example, from the right to the left. If the shifting speed is faster, the user recognizes by intuition that the power consumption is larger.

Such display may be carried out only once or may be repeated for predetermined cycles. In this particular case, the shifting speed of the light (or the timing of switching the LEDs 11) is calculated in step 34.

In any event, what is calculated in step S34 is the speed of lighting the LEDs in response to the lighting processing in step S35. In step S35, ON/OFF condition of the LED driving control switches 91-1 through 91-4 (see FIG. 6) is controlled based on the calculated lighting speed for performing the lighting processing of the LEDs 11.

As described hereinabove, in the condition when the secondary battery 1 is connected to the designated device, a display is made in response to the power consumed by the device in the display section 2. However, in the condition when the secondary battery 1 is not connected to the designated device, a different display from the condition when it is connected to the designated device is made in the display section 2. In other words, if it is determined that the discharging current I2 is less than the threshold current Ix in step S33, a display different from the case when the discharging current I2 is determined to be larger than the threshold current Ix is made in the display section 2.

If the discharging current I2 is determined to be smaller than the threshold current I2 in step S33, the process proceeds to step S36. The case proceeding to step S36 is not the condition in which the secondary battery 1 is connected to the designated device or the condition in which the secondary battery 1 is connected to the designated device whose power is turned off, thereby not supplying any power to the designated device. In other words, if the switch 12 is operated while the secondary battery 1 is operating alone, the information on the residual capacity of the secondary battery 1 is displayed in the display section 2.

In order to display information on the residual capacity of the secondary battery 1 in the display section 2, the residual capacity of the secondary battery 1, i.e., the residual capacity of the battery cells 63-1 and 63-2 are calculated in step S36.

Such calculation is carried out by the microcomputer 62 based on the acquired information such as current, voltage, power, temperature and the like. The microcomputer 62 acquires such information as current, voltage, power and the like from the IC 61 while temperature information is acquired from the thermistor 70 (see FIG. 5).

In this particular embodiment, since the calculation is carried out by using such information as current, voltage, power, temperature and the like, it is possible to calculate the residual capacity more accurately as compared to calculation by using only voltage. Since the lighting processing is carried out by using such calculation result in step S35, the lighting is able to represent the residual capacity more accurately.

Figure 11:
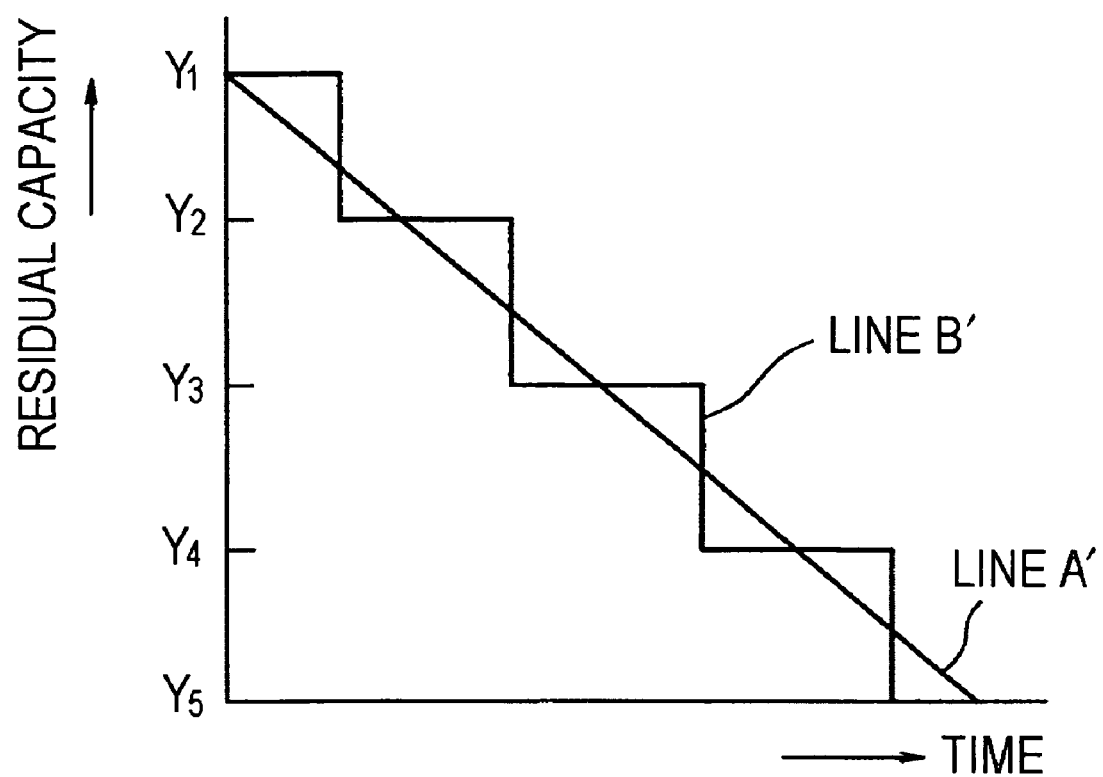
FIG. 11 is a graph for describing errors between the actual residual capacity and the calculated residual capacity of the secondary battery.

Now, the calculation procedure of the residual capacity in step S36 and the lighting procedure in step S35 based on the calculation result are described hereunder by reference to FIG. 11 and also FIG. 9A through FIG. 9F as an inevitable consequence.

FIG. 11 is a graph showing the relationship between the residual capacity as calculated by the microcomputer 62 and the actual residual capacity of the batteries 63 defining the secondary battery 1. As represented by the line A', the actual residual capacity decreases with time in a linear function.

As shown by the line B', the residual capacity as calculated by the microcomputer 62 decreases with time in a gradual manner. It decreases in steps because of the following reasons. In FIG. 11, the residual capacity is divided into 5 steps, or the residual capacities Y1 through Y5. If the residual capacity as calculated by the microcomputer 62 is Y1, i.e., if it is determined that the residual capacity is in the range from 75% to 100%, all of the 4 LEDs 11-1 through 11-4 are lighted as shown in FIG. 9B.

If the residual capacity as calculated by the microcomputer 62 is Y2, i.e., if it is determined that the residual capacity is in the range from 50% to 75%, 3 LEDs 11-1 through 11-3 are lighted as shown in FIG. 9C. If the residual capacity as calculated by the microcomputer 62 is Y3, i.e., if it is determined that the residual capacity is in the range from 25% to 50%, 2 LEDs 11-1 and 11-2 are lighted as shown in FIG. 9D.

If the residual capacity as calculated by the microcomputer 62 is Y4, i.e., if it is determined that the residual capacity is in the range from 0% to 25%, only LED 11-1 is lighted as shown in FIG. 9E. Finally, if the residual capacity as calculated by the microcomputer 62 is Y5, i.e., if it is determined that the residual capacity is substantially 0% and the secondary battery 1 needs to be charged, the single LED 11-1 blinks as shown in FIG. 9F.

As described hereinabove, since the residual capacity is represented by the 4 LEDs 11 in this particular embodiment, it is possible to indicate the residual capacity in 5 steps (5 conditions). It is sufficient to divide the range of the residual capacity into steps that can be indicated. Thus, the microcomputer 62 is designed to calculate the residual capacity in response to such steps. If the display section 2 is provided with, for example, 10 LEDs 11 rather than 4, it is possible to indicate 11 steps. Accordingly in this case, the microcomputer 62 is designed to calculate the residual capacity in 11 steps.

Although there is an error between the line A' showing the actual residual capacity and the line B' showing the calculated residual capacity in FIG. 11, such error is caused by the calculated residual capacity that is set in 5 steps that can be indicated by using 4 LEDs 11 as described hereinabove. It is to be noted that the microcomputer 62 itself can calculate the same value as the line A'. The reason for making it possible is because the microcomputer 62 calculates the residual capacity comprehensively by using such information as current, voltage, power, temperature and the like, thereby enabling to accurately calculate the residual capacity.

Incidentally, when the residual capacity is indicated as shown in FIG. 9F, the user is required to set the secondary battery 1 onto the dedicated charger 41 (see FIG. 4) for charging the secondary battery 1. The operation of the microcomputer 62 under the condition of the secondary battery 1 being charged will be described hereinafter by reference to the flowchart in FIG. 12. The processing based on the flowchart in FIG. 12 is one relating to the display in the display section 2 for letting the user recognize that the secondary battery 1 is being charged.

Figure 12:
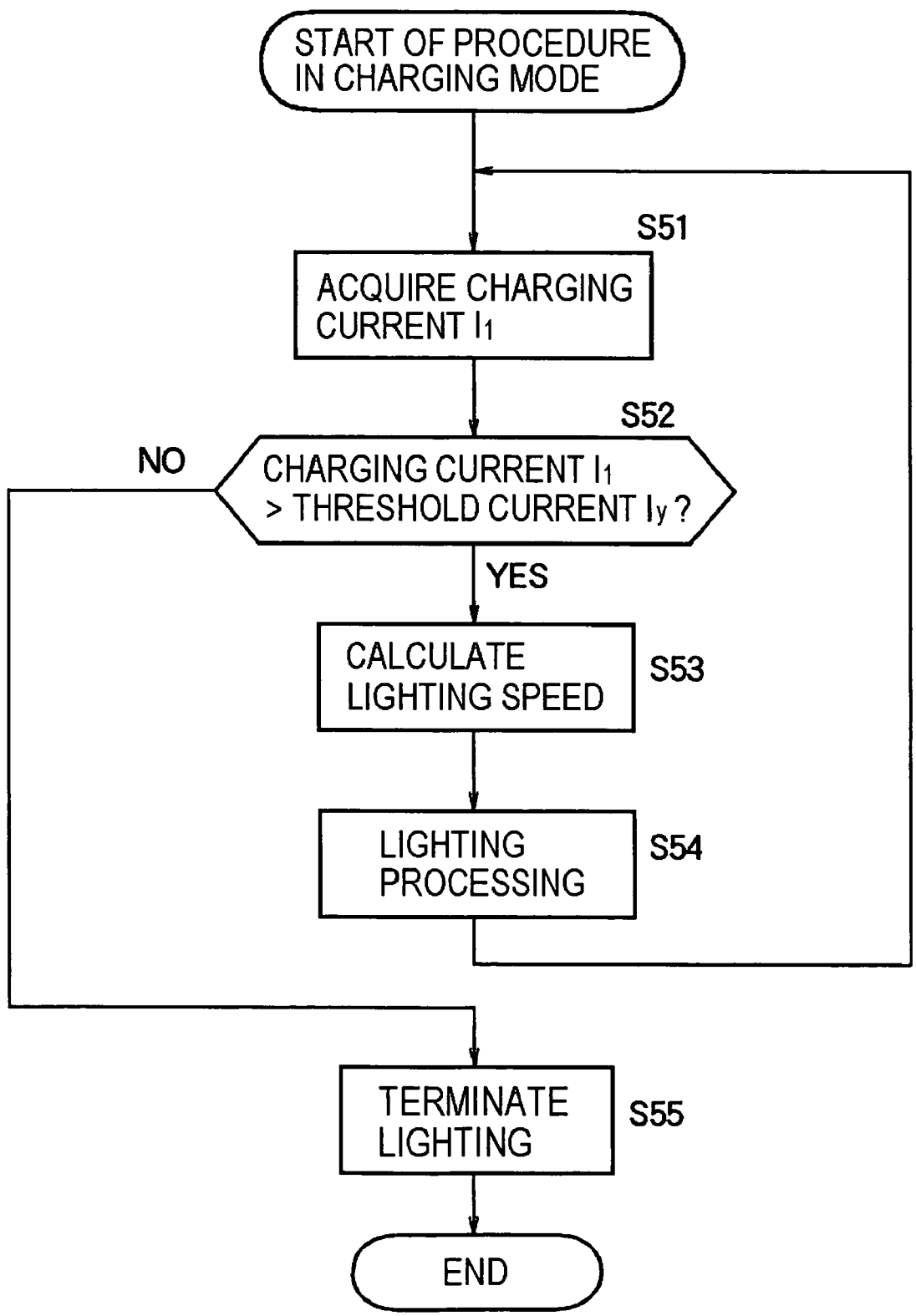
FIG. 12 is a flowchart for describing the operation when the secondary battery is being charged.

Since it is the processing to let the user recognize that the secondary battery 1 is being charged, the processing according to the flowchart as shown in FIG. 12 is carried out regardless of the operation of the switch 12. It is, of course, possible to carry out the processing only when the switch 12 is operated. However, it is described herein that the processing is carried out regardless of the operation of the switch 12.

In step S51, the microcomputer 62 acquires the charging current I1. Subsequently, in step S52, judgment is made if the acquired charging current I1 is larger than the threshold current Iy. The processing in steps S51 and S52 are substantially the same as those in steps S32 and S33 which are described hereinabove and thus no further description will be made herein. It is to be noted, however, that the threshold currents Ix and Iy may be set to the same value or different values.

If it is determined in step S52 that the charging current I1 is larger than the threshold current Iy, i.e., if it is determined that the secondary battery 1 is being charged, the procedure proceeds to step S53, in which the lighting speed of the LEDs 11 is calculated. The lighting speed of the LEDs 11 will be described hereinafter.

Figure 13:
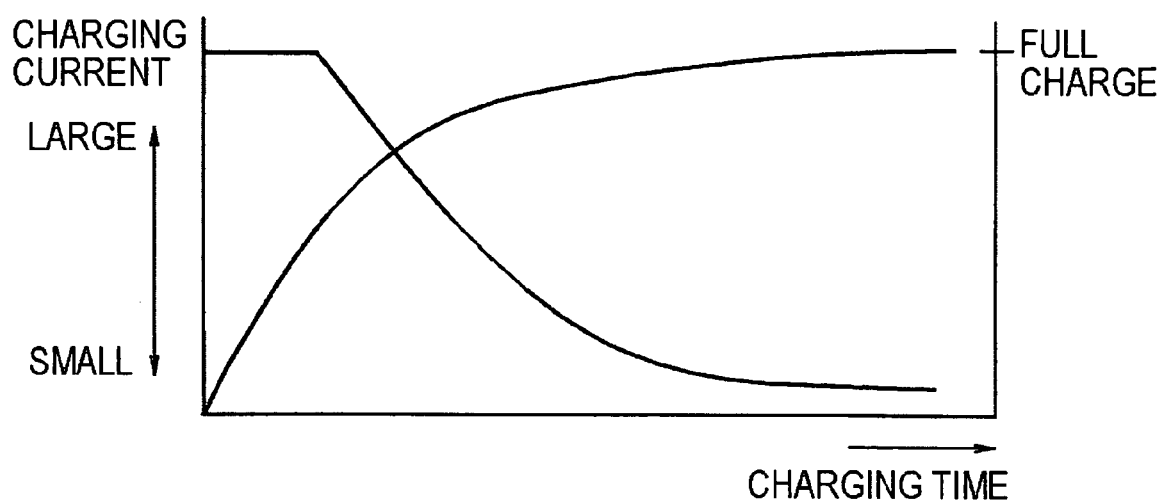
FIG. 13 is a graph for describing the relationship between the charging current and the residual capacity of the secondary battery.

FIG. 13 is a graph showing the relationship between the residual capacity of the secondary battery 1 and the current to be supplied to the secondary battery 1 from the charger 41 (the magnitude of the current flowing through the resistor 64 in the secondary battery 1 while charging it), which is suitably referred to as charging current below. Since this is the condition when charging is required, the residual capacity of the secondary battery 1 is substantially 0 but it increases gradually with time (as being charged).

Figure 14:
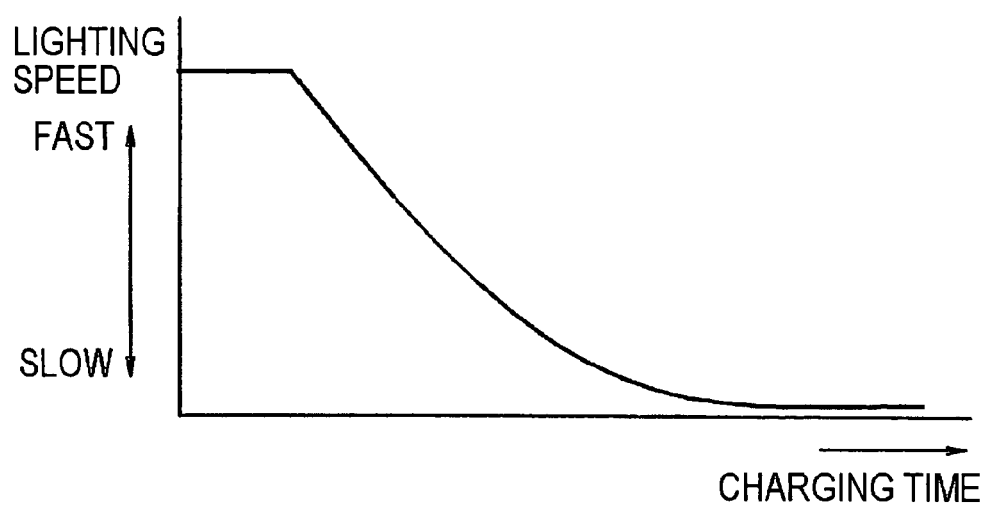
FIG. 14 is a graph for describing the lighting speed.

On the contrary, the charging current remains in a constant value until the residual capacity of the secondary battery exceeds a given level but decreases gradually thereafter. The charging current is expressed by the lighting of the LEDs 11 to let the user recognize that the secondary battery 1 is being charged and also to give the user imaginatively an acknowledgement of the charging current that flows while it is being charged. For this end, the lighting speed such as the graph as shown in FIG. 14 is conceivable as the lighting speed of the LEDs 11. The lighting speed as expressed in the graph in FIG. 14 is similar to the graph of the charging current as shown in FIG. 13.

The lighting speed changes in proportion to the charging current. This arrangement is effective and easy to let the user recognize the charging current. It is, of course, possible to change the lighting speed in a step manner based on the charging current. For example, plural lighting speeds and/or plural lighting patterns of different number of LEDs may be prepared so that the user can choose them. It is possible to provide a mechanism to store such patterns in the program storage section 112 (see FIG. 7) so that the user can choose them by operating the switch 12.

It is described herein on an example that the charging current is directly reflected onto the lighting speed as shown in FIG. 14. In step S53, the lighting speed is calculated in response to the charging current, i.e., the charging current I1 which is acquired in step S51. The lighting processing is carried out in step S54 based on the calculated lighting speed.

Figure 15A:
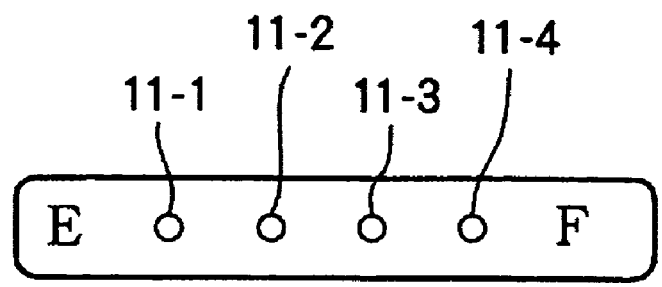
FIGS. 15A to 15E are charts for describing the lightings of the LEDs.
Figure 15B:

Now, the lighting processing in step S54 will be described by reference to FIG. 15 through FIG. 15E. As shown in FIG. 15A, no LEDs 11-1 through 11-4 are lighted prior to charging (i.e., before the charging current I1 is acquired). If charging is started from such condition, it becomes a condition in which only the LED 11-1 is lighted as shown in FIG. 15B. After a given time, the condition is switched to a next condition in which only the LED 11-2 is lighted as shown in FIG. 15C.

Figure 15C:
Figure 15D:

After passing a given time from the lighting condition as shown in FIG. 15C, it is switched to a condition in which only the LED 11-3 is lighted as shown in FIG. 15D. Finally, after passing a given time from the lighting condition as shown in FIG. 15D, it is switched to a condition in which only the LED 11-4 is lighted as shown in FIG. 15E. In the above manner, only one LED is sequentially lighted at every passage of a given time.

Figure 15E:

After passing a given time from the lighting condition as shown in FIG. 15E, it returns to a condition in which no LEDs 11 are lighted as shown in FIG. 15A. Thereafter, each of the lighting conditions as sown in FIG. 15B through FIG. 15E is repeated. As for the repetition, it is conceivable that the lighting display as shown in FIG. 15B through FIG. 15E are set to be carried out only once or for plural times in the lighting procedure in step S54.

In case of setting to carry out once the lighting procedure in step S54, it returns to step S51 as soon as completing the procedure in step S54 for carrying out the subsequent processing. On the other hand, in case of carrying out the lighting procedure for plural times in step S54, it returns to step S51 after carrying out the switching of the lighting conditions as shown in FIG. 15A through FIG. 15E for the predetermined plural times, then carrying out the subsequent processing.

The given time in this particular case means the lighting speed which is calculated in step S53. In other words, the lighting speed is to control the timing to switch the LED 11 to be lighted. By sequentially switching the lighting conditions as shown in FIG. 15A, FIG. 15B, FIG. 15C, FIG. 15D, FIG. 15E and FIG. 15A in this particular sequence at every passage of a given time, it is seen to the user as if the light of the lighting LED 11 shifts from the condition E (Empty) towards F (Full) in the display section 2. Accordingly, the user may easily recognize by an image that the secondary battery 1 is being changed from the Empty condition towards the Full condition in order to revive the residual capacity.

As described hereinabove, the light from the LEDs 11 shifts from the character "E" towards the character "F" in the display section 2 when the secondary battery 1 is in the charging mode while it moves from "F" to "E" in the discharging mode. In this manner, it is possible to let the user recognize by an image that the secondary battery 1 is approaching the full capacity condition when the light moves from "E" towards "F" (in the charging mode) but is approaching to Empty capacity when it moves from "F" towards "E" (in the discharging mode).

Since the speed of moving the light of the lighting LED 11 is proportional to (or based on) the current flowing through the secondary battery 1, the user is able to recognize by intuition not only the condition whether the secondary battery 1 is in the charging mode or the discharging mode but also the current status in each mode, for example, whether the charging is approaching to the final stage or the residual capacity is approaching to 0.

Now, returning to the description of the flowchart as shown in FIG. 12, repetition of the procedure in steps S51 through S54 provides the user with indications of the mode in which the secondary battery 1 is in charging and its status. And as soon as the residual capacity of the secondary battery 1 returns to the Full condition, such charging procedure is interrupted.

Judgment of interrupting such charging is made in step S52. That is, if it is determined that the charging current I1 is less than the threshold current Iy in step S52, or if it is determined that the current flowing through the secondary battery 1 approaches to 0 because its residual capacity is near the Full condition, the procedure proceeds to step S55 in order to stop charging.

In step S55, the lighting procedure of the LEDs 11 in the display section 2 as described hereinabove is terminated. Upon termination of the display, the charging procedure is also terminated. Termination of the charging procedure is made by opening the charging control switch 66 (see FIG. 6).

In the manner as described hereinabove, the secondary battery 1 according to the particular embodiment of the present invention can carry out different displays in the display section 2 by judging the respective conditions such as when it is exhibited in a shop, supplying power to the designated device, standing alone, being charged or the like. By providing such displays, it is possible to let the user recognize by intuition and easily the status of the secondary battery 1.

In the above embodiment, the secondary battery 1 is described to store the total (accumulated) time of each of the charging time and the discharging time. Preferably, independent storage of such total time enables to incorporate a mechanism for notifying the user that the secondary battery 1 is approaching to the end of its lifetime and better to be replaced, for example, when the total time reaches the designated time.

In case when the secondary battery 1 is returned to the manufacturer from the user due to, for example, any trouble, the manufacturer is also able to read out the total time stored in the memory of the returned secondary battery 1 to acquire information about how long the secondary battery 1 is used. Such acquired information can be used to make any improvement on the secondary battery 1.

Although there is no description about the color of the light that the LEDs 11 emit in the secondary battery 1 of the embodiment as described hereinabove, it is possible to use LEDs of any desired color. Also, it is possible to use the same color for all of the LEDs 11-1 through 11-4 but may use different colors for them. For example, the LED 11-1 is preferable to use a different color from those of the other LEDs 11-2 through 11-4 because the LED 11-1 is designed to blink when the residual capacity of the secondary battery 1 is in the Empty condition to warn the user for charging.

The secondary battery 1 is provided with the program storage section 112 (see FIG. 7) as one of its functions. It is possible to input from, for example, a personal computer any program to be stored in the program storage section 112 and/or data required for performing any job by the secondary battery 1. In case of inputting such program and/or data from a personal computer, required are some devices for interconnecting such personal computer and the secondary battery 1.

If such devices are used, any program and data that are supplied to the secondary battery 1 are stored in a designated recording medium and are distributed to the user. Now, such recording medium will be described hereunder.

In case of executing a series of processing by means of software, programs constituting such software is installed from the recording medium into a dedicated hardware which is assembled in a computer or, for example, into a general purpose personal computer or the like which is capable of carrying out various functions by installing various programs.

Figure 16:
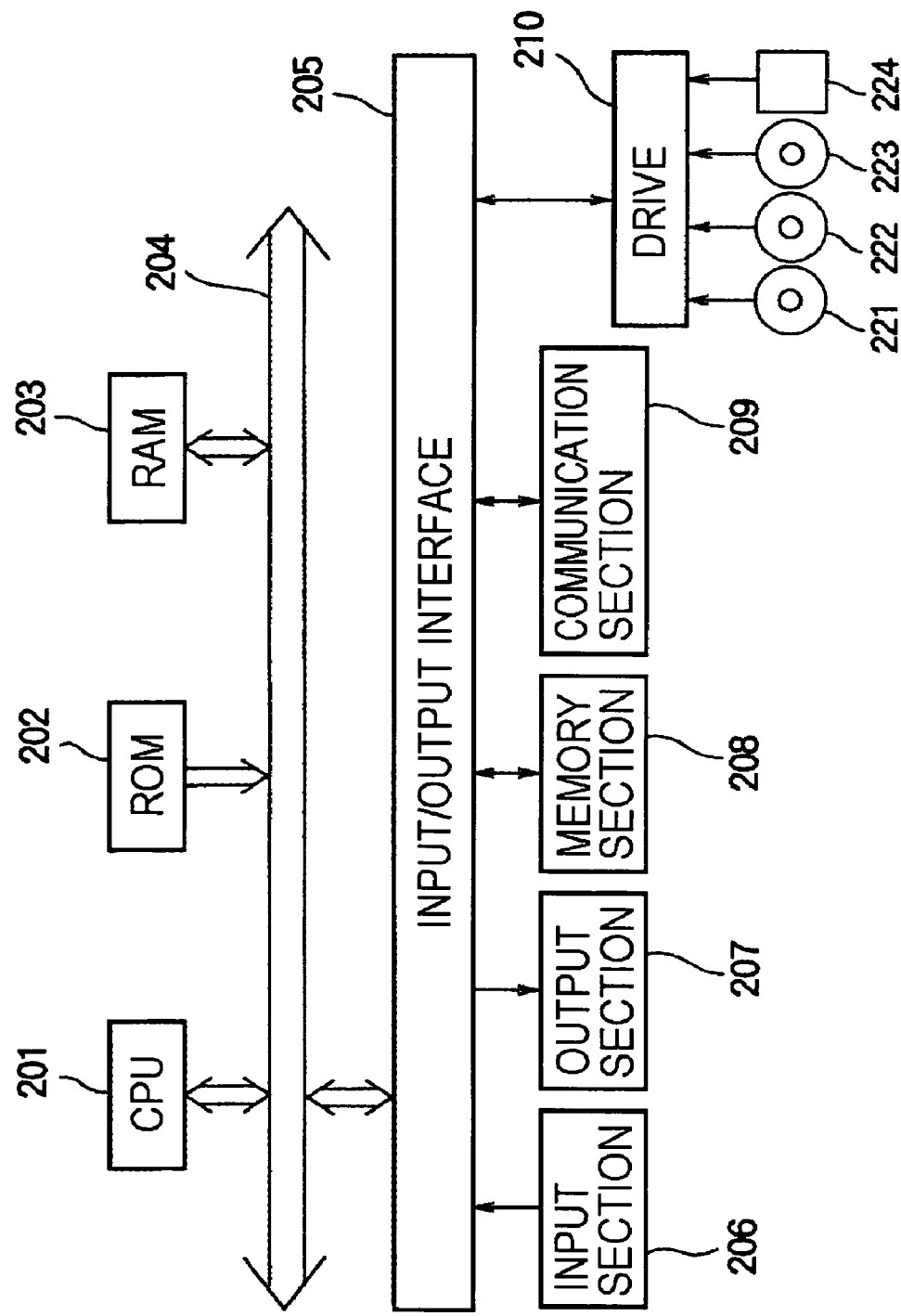
FIG. 16 is a block diagram for describing a recording system.

FIG. 16 is a functional block diagram to show the internal construction of a general purpose personal computer. A CPU (Central Processing Unit) 201 of the personal computer executes various processing in accordance with programs stored in a ROM (Read Only Memory) 202. A RAM (Random Access Memory) 203 suitably stores data and programs required by the CPU 201 in order to execute various processing. Connected to an input/output interface 205 is an input section 206 which comprises a keyboard and a mouse. Signals inputted to the input section 206 are applied to the CPU 201. Also connected to the input/output interface 205 is an output section 207 which comprises a display, a speaker, etc.

Additionally, connected to the input/output interface 205 are a memory section 208 comprising a hard disk and the like and a communication section 209 for transmitting and receiving data to and from other devices by way of a network such as internet. A drive 210 is used to read out or write data from and in a recording medium such as a magnetic disk 221, an optical disk 222, a magneto optical disk 223, a semiconductor memory 224, etc.

As shown in FIG. 16, a recording medium is distributed to users in order to provide programs separately from the personal computer. A recording medium comprises not only a package medium comprised of the magnetic disk (including a flexible disk) 221, the optical disk (including a CD-ROM (Compact Disc-Read Only Memory) and a DVD (Digital Versatile Disc)) 222, the magneto optical disk (including MD (Mini-Disc) (trademark)) 223 or the semiconductor memory 224 but also a hard disk and the like including the ROM 202 and the memory section 208 in which the programs are stored and which are provided to the user in the condition preinstalled in the computer.

It is to be noted in this specification that the steps describing the programs which are provided by means of a medium can be executed not only sequentially but also in other ways, for example, in parallel manner or individually.

What is claimed is:

1. A secondary battery comprising:

time measuring means for measuring charging time or discharging time of the secondary battery;

memory means for storing time information obtained by accumulating the time measured by said time measuring means;

display means including a plurality of luminous bodies for displaying a predetermined information by lighting said luminous bodies; and judging means for making judgment if the time represented by said time information as stored in said memory means exceeds a predetermined time whenever being instructed to display the predetermined information by said display means; wherein:

said display means displays all display patterns of information relating to the residual capacity of the secondary battery as the predetermined information regardless of the residual capacity if said judging means determines that the time of said time information does not exceeds the predetermined time.

2. The secondary battery according to claim 1, wherein:
said memory means stores the accumulated charging time when the secondary battery is charged and the accumulated discharging time when the secondary battery is discharged as the time information; and
said judging means judges if at least one of the time information represented by the charging time and the discharging time exceeds the predetermined time.

3. The secondary battery according to claim 1, wherein:
the display of said all display patterns of the information relating to the residual capacity by said display means is display of incrementing or decrementing the number of lighted luminous bodies among said plurality of luminous bodies one by one.

4. A display method of carrying out a display by a secondary battery, comprising:
a time measuring step for measuring the charging time or the discharging time of the secondary battery;
a storage control step for controlling the storage of time information obtained by accumulating the time measured in said time measuring step;
a control step for controlling display means comprising a plurality of luminous bodies for carrying out the display of a predetermined information by lighting the luminous bodies; and
a judging step for judging if the time represented by the time information controlled as storage through the processing in said storage control step exceeds a predetermined time whenever instructed to display the predetermined information in said control step; wherein:
all display patterns of information relating to the residual capacity of the secondary battery are displayed regardless of the residual capacity if it is determined that the time represented by the time information does not exceeds the predetermined time in said judging step.

5. A recording medium on which a computer readable program relating to a display performed by a secondary battery is recorded, wherein said program comprising:
a time measuring step for measuring the charging time or the discharging time of the secondary battery;
a storage control step for controlling the storage of time information accumulating the time measured in said time measuring step;
a control step for controlling display means comprising a plurality of luminous bodies for displaying designated information by lighting the luminous bodies; and
a judging step for judging if the time represented by the time information controlled as storage in said storage control step exceeds a predetermined time whenever being instructed to display the predetermined information in said control step; wherein:
all display patterns of information relating to the residual capacity of the secondary battery are displayed regardless of the residual capacity if it is determined that the time represented by the time information does not exceed the predetermined time in said judging step.

6. A program executed by a computer for controlling the processing of a display performed by a secondary battery, said program comprising:
a time measuring step for measuring the charging time or the discharging time of the secondary battery;
a storage controlling step for controlling the storage of time information accumulating the time measured in said time measuring step;
a control step for controlling display means comprising a plurality of luminous bodies for displaying a predetermined information by lighting the luminous bodies; and
a judging step for reading out the time information controlled as storage in the processing in said storage control step and for judging if the time represented by the time information does not exceed a predetermined time whenever being instructed to display the predetermined information in said control step; wherein
all display patterns of information relating to the residual capacity of the secondary battery are displayed regardless of the residual capacity if it is determined that the time represented by the time information does not exceed the predetermined time in said judging step.

7. A secondary battery including:
detection means for detecting the magnitude of the current flowing inside the secondary battery;
display means comprising a plurality of luminous bodies;
calculation means for calculating the timing to light the plurality of luminous bodies in response to the current magnitude detected by said detection means; and
control means for controlling said display means based on the timing calculated by said calculation means.

8. The secondary battery according to claim 7, wherein:
said control means sequentially lights one of said plurality of luminous bodies defining said display means; and
said calculation means calculates the timing of lighting said luminous bodies.

9. The secondary battery according to claim 7, wherein:
said control means controls said display means whenever being instructed to display by said display means in case of detection of the current by said detection means in the discharging mode; and
said control means controls said display means regardless of the instruction to display by said display means in case of detection of the current by said detection means in the charging mode.

10. A display method for displaying in a secondary battery, comprising:
a detection step for detecting the magnitude of the current flowing inside the secondary battery;
a display control step for controlling the display of display means comprising a plurality of luminous bodies; and
a calculation step for calculating the timing of lighting said plurality of luminous bodies in response to the current magnitude detected in the processing in said detection step; wherein:
said display control step controls the display of said display means based on the timing calculated in the processing in said calculation step.

11. A recording medium on which a computer readable program relating to a display preformed by a secondary battery is recorded, said program comprising:
a detection step for detecting the magnitude of the current flowing inside the secondary battery;
a display control step for controlling the display of display means comprising a plurality of luminous bodies; and
a calculation step for calculating the timing of lighting the plurality of luminous bodies in response to the current magnitude in case when such current is detected in the processing in said detection step; wherein said display control step controls the display of said display means based on the timing calculated in the processing in said calculation step.

12. A program for making a computer to execute procedure for controlling a display performed by a secondary battery, said program comprising:

a detection step for detecting the magnitude of the current flowing inside the secondary battery;

a display control step for controlling the display of display means comprising a plurality of luminous bodies; and a calculation step for calculating the timing of lighting the plurality of luminous bodies in response to the current magnitude in case when such current is detected in the processing in said detection step; wherein:

said display control step control the display of said display means based on the timing calculated in the processing in said calculation step.

* * * * *